United States Patent [19]

Koht et al.

[11] 4,123,047

[45] Oct. 31, 1978

[54] MODULAR CLIP ASSEMBLY FOR HEAT SHRINKABLE MATERIAL

[75] Inventors: Lowell I. Koht, Palo Alto; Michael J. Kinsch, Jr., Sunnyvale; William H. Humphries, Freemont, all of Calif.

[73] Assignee: Raychem Corporation, Menlo Park, Calif.

[21] Appl. No.: 750,977

[22] Filed: Dec. 15, 1976

[51] Int. Cl.$^2$ ............................................. B25B 5/14
[52] U.S. Cl. ................................. 269/238; 24/252 R; 269/254 R
[58] Field of Search ......... 269/254 CS, 254 R, 254 B, 269/237–239; 24/252 PC; 228/46, 57

[56] References Cited

U.S. PATENT DOCUMENTS

| | | | |
|---|---|---|---|
| 490,806 | 1/1893 | Gulick | 24/252 PC |
| 1,474,102 | 11/1923 | Ashmore | 24/252 PC |
| 2,586,215 | 2/1952 | Federica | 24/252 B |
| 3,317,973 | 5/1967 | Finkle | 24/252 PC |

FOREIGN PATENT DOCUMENTS

| | | | |
|---|---|---|---|
| 704,444 | 2/1954 | United Kingdom | 24/252 R |
| 1,363,710 | 8/1974 | United Kingdom | 228/46 |

*Primary Examiner*—Robert C. Watson
*Attorney, Agent, or Firm*—Lyon & Lyon

[57] ABSTRACT

A modular, reusable installation tool for clamping laid-together portions of cross-linked, dimensionally heat unstable polymeric material along a to-be-formed bond line during the application of heat from an external source to form a bond between clamped portions of the material. The tool comprises an assembly of hand-operated clip modules which are threaded longitudinally on a cable to facilitate their rapid one-hand installation and removal along a bond line. An improved modular clip is disclosed which incorporates a pair of bond line gripping flanges attached to a pair of ventilated cooperating jaw plates.

16 Claims, 13 Drawing Figures

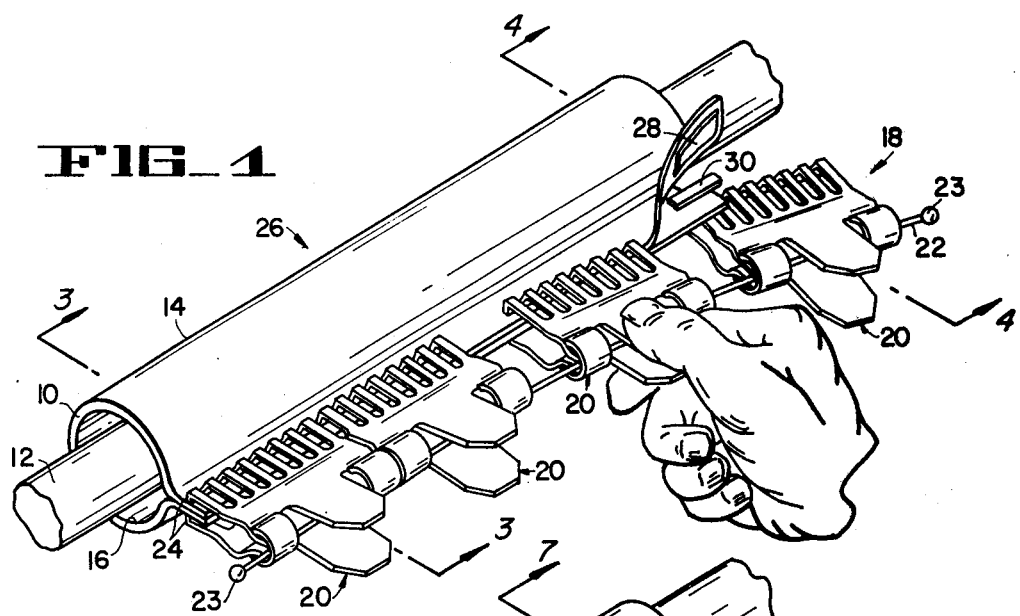
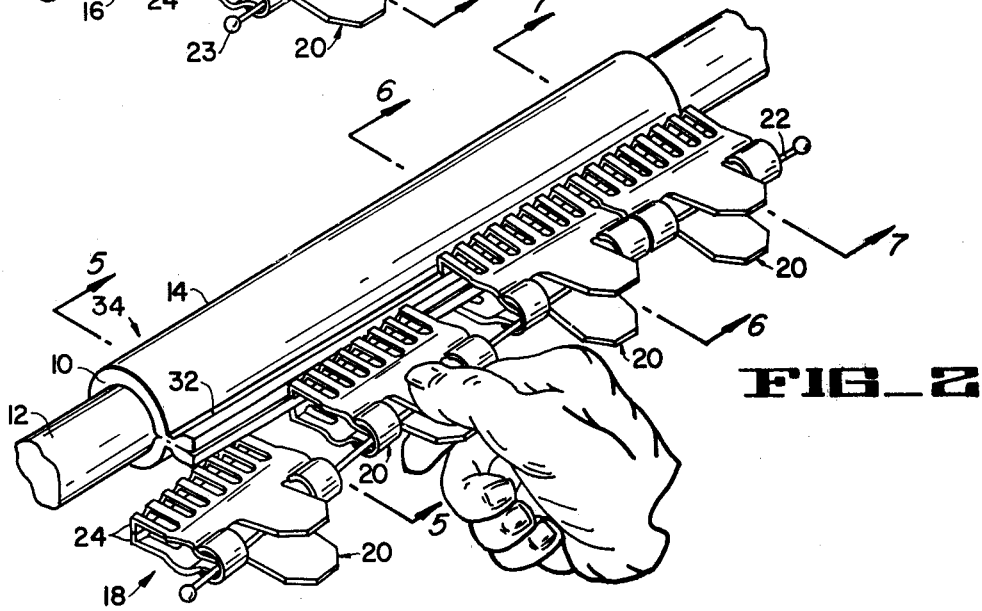
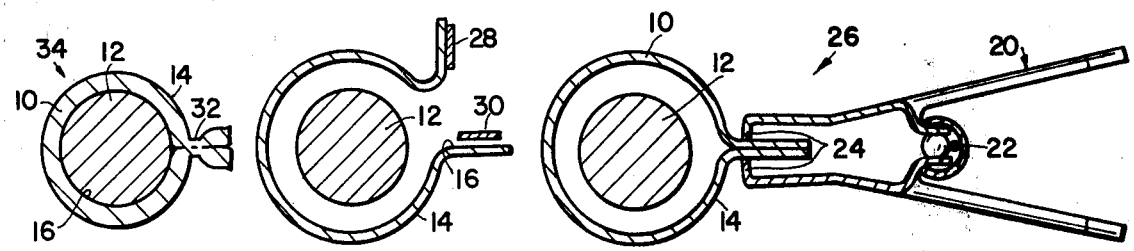
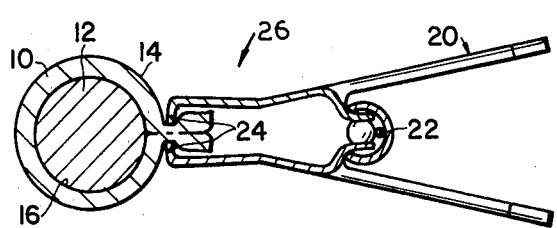
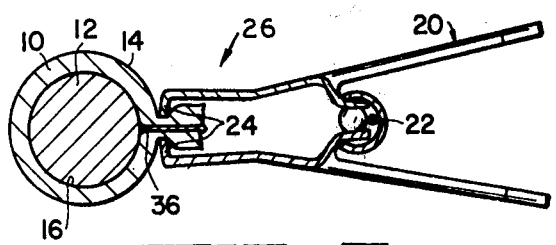

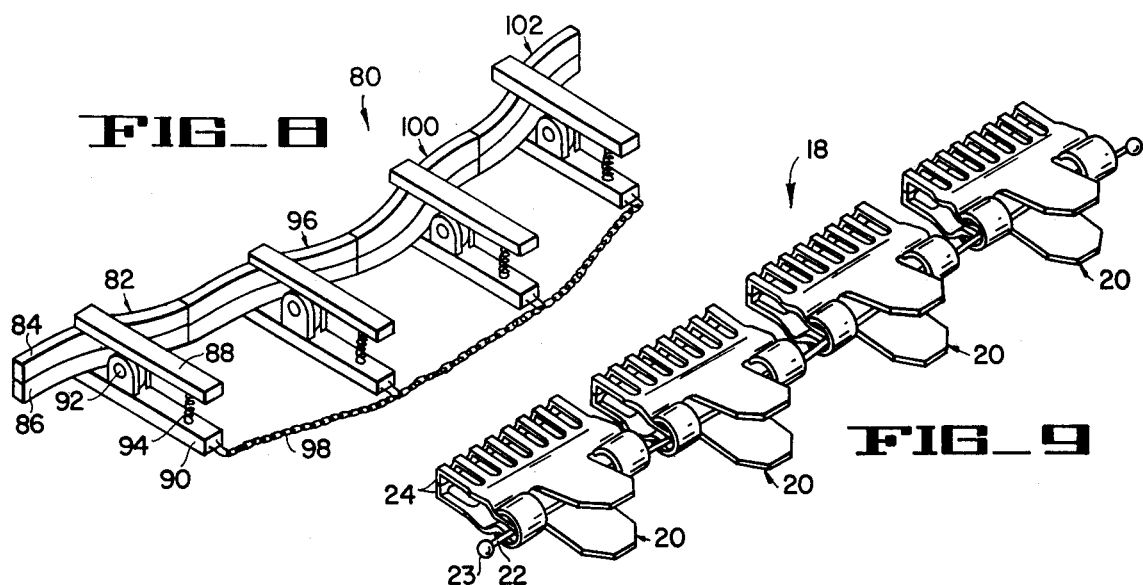
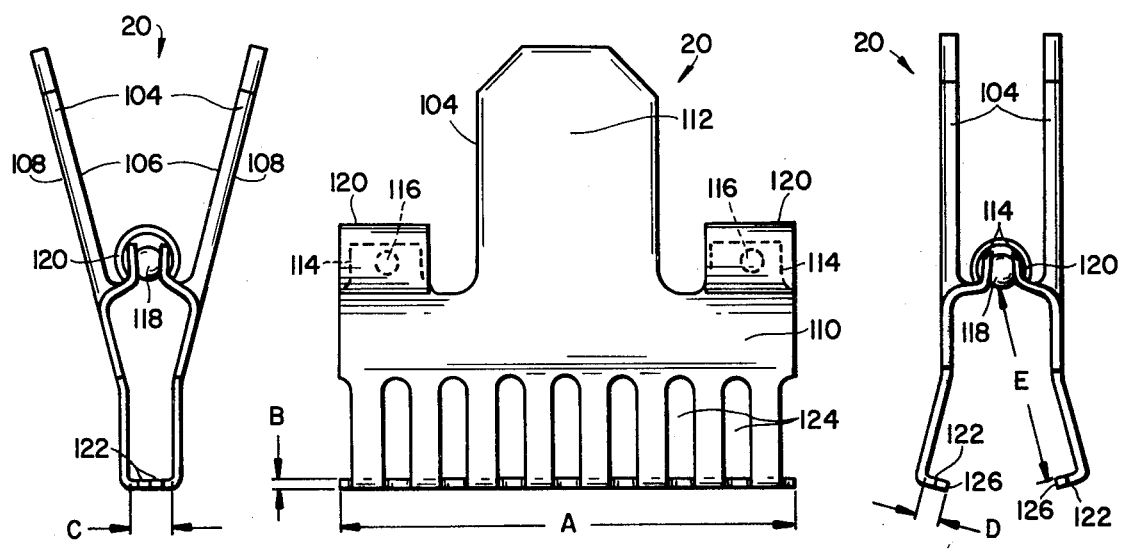
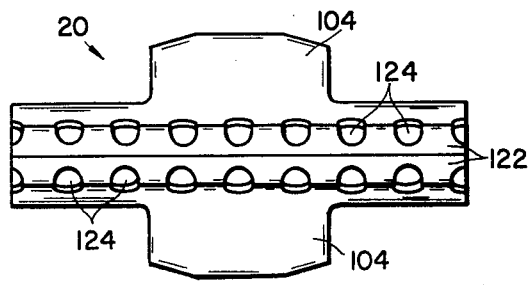

MODULAR CLIP ASSEMBLY FOR HEAT SHRINKABLE MATERIAL

BACKGROUND OF THE INVENTION

I. Field of the Invention:

This invention relates to manually operated clips and similar temporary clamping devices. More specifically, the invention relates to a reusable installation tool formed with a plurality of longitudinally interconnected clip modules which is adapted for joining laid-together portions of heat recoverable sheet material.

II. Description of the Prior Art:

A wide variety of manually operated spring clamping devices adapted for particular applications are known in the prior art. The use of such a device to temporarily clamp laid-together portions of dimensionally heat unstable polymeric sheet material during the application of heat to join the clamped portions of the material is believed by applicants to be heretofore unknown. Such a use in conjunction with the formation of a wrap-around closure member is disclosed in a concurrently filed U.S. patent application entitled "Method for Forming a Closure Using Heat Recoverable Sheet Material", U.S. Ser. No. 750,976 filed Dec. 15, 1976. This application is assigned to the assignee of the present invention and is incorporated herein by reference. Of the clamping devices known in the prior art, none are particularly well adapted for this new use.

One embodiment of the invention relates to improvements in a clip described in U.S. Pat. No. 1,474,102 issued to Leon H. Ashmore on Nov. 13, 1923, the disclosure of which is incorporated herein by reference.

SUMMARY OF THE INVENTION

The present invention overcomes many of the disadvantages associated with manually operated spring clamping devices known in the prior art which could be used for clamping laid-together portions of cross-linked dimensionally heat unstable polymeric material along a to-be-formed bond line during the application of heat from an external source to form a bond between clamped portions of the material. It does so by providing a novel modular clip assembly including at least two clip modules each of which possesses first and second parallel jaws, first and second handles connected respectively to the jaws, hinge means for allowing the jaws to move cooperatively into and out of engagement with each other in longitudinally parallel relationship, and spring means for urging the jaws into mutual engagement. Flexible linking means interconnecting the at least two clip modules are employed for maintaining a selected longitudinal relationship between the modules thereby facilitating the hand installation of the modular clip assembly along the to-be-formed bond line.

In one embodiment, improvements are made to a clip of the type having a pair of longitudinally parallel jaws formed with cooperating plates, spring means urging the jaws toward a closed position in which the jaws are in contact with each other, and manually operable means for urging the jaws away from the closed position, wherein the improvements include a pair of jaws each possessing a gripping flange disposed inwardly at the terminal portion of each cooperating plate, each gripping flange and associated plate having a generally L-shaped cross-sectional configuration, the short arms of the L's which correspond to the gripping flanges being substantially colinear in the closed position, the portions of the plates corresponding to the long arms of the L's being provided with a plurality of ventilating apertures adjacent the gripping flanges.

For specific applications, the parallel jaws of each clip module can be configured to conform to that portion of a selected to-be-formed curved bond line corresponding to the module—s position in the longitudinal assembly.

BRIEF DESCRIPTION OF THE DRAWINGS

The many objects and advantages of the present invention will become apparent to those skilled in the art when the following description of the best mode contemplated for practicing the invention is read in conjunction with the accompanying drawings, wherein like reference characters refer to the same or similar elements, and in which:

FIG. 1 is a perspective view of a sheet of heat-shrinkable polymeric material partially installed with the modular clip assembly of the invention around a substrate;

FIG. 2 is a perspective view of the modular clip assembly of the invention partially removed from along the clamped and bonded portions of the sheet;

FIG. 3 is a cross-sectional view of a clip module installed on a to-be-formed bond line along laid-together portions of the sheet as seen through the lines 3—3 in FIG. 1;

FIG. 4 is a cross-sectional view through the lines 4—4 in FIG. 1 showing adhesives positioned for clamping between laid-together portions of the sheets;

FIG. 5 is a partial cross-sectional view through the lines 5—5 in FIG. 2 which shows a portion of a completed closure member formed around the substrate with the clip module removed;

FIG. 6 is a cross-sectional view through the lines 6—6 in FIG. 2 which shows a portion of the bonded and heat shrunk sheet with a reusable clip module still in place;

FIG. 7 is a cross-sectional view through the lines 7—7 in FIG. 2 which shows the clamped, bonded and heat-shrunk sheet with a bonding adhesive disposed between the clamped portions;

FIG. 8 is a perspective view of a stylized modular clip assembly of the invention possessing curved cooperating parallel jaws for forming a selected curved bond line;

FIG. 9 is a perspective view of a presently preferred embodiment of the invention;

FIG. 10 is an end view of a presently preferred improved modular clip shown with the cooperating parallel jaws in the closed position;

FIG. 11 is a side view of the improved modular clip shown in FIG. 10;

FIG. 12 is an end view of the improved modular clip of FIG. 10 shown with the cooperating parallel jaws in an open position; and FIG. 13 is a view looking into the closed jaws of the improved modular clip shown in FIG. 11.

DETAILED DESCRIPTION OF THE PREFERRED EMBODIMENT

Referring now generally to the several figures and specifically to FIG. 1, a sheet of cross-linked, dimensionally heat-unstable polymeric material 10 is shown wrapped partially about an elongated substrate 12. The substrate 12 may comprise for example, a conductor, a pipe, a connector, or the like. Moreover, the substrate 12 need not be of constant cross-section as is shown in FIGS. 1 through 7. The heat instability of the sheet 10 and its orientation with respect to the substrate 12 is preferably such that the sheet is shrinkable around the circumferance of the substrate and most preferably such that the sheet is shrinkable around the circumferance of the substrate without a substantial change in length along the longitudinal axis of the substrate. A particularly economical sheet with the preferred heat instability characteristics can be fabricated by simply extruding a tube and rendering it heat shrinkable by the method of Cook et al., U.S. Pat. No. 3,086,242, the disclosure of which is incorporated herein by reference. A heat recoverable tube so fabricated is then slit longitudinally to form the desired sheet.

The sheet 10 possesses a pair of primary surfaces 14 and 16 which will for convenience be referred to as the outside surface and the inside surface respectively. It is, of course, obvious that the relative positions of the primary surfaces 14 and 16 can be easily interchanged by wrapping the sheet 10 "inside-out" around the substrate 12. After the sheet 10 is wrapped around the substrate 12, portions of the inside surface 16 are laid together in contact with one another to form a generally tubular structure around the substrate 12. The portions of the sheet which are laid together as described and shown are said to be arranged in a lay-up lap seal configuration. This configuration of the sheet 10 is to be distinguished from an overlap seal configuration wherein a portion of the inside surface 16 is juxtaposed with a portion of the outside surface 14 again forming a generally tubular structure which surrounds the substrate 12. The importance of using a lay-up lap seal configuration rests in the ability of the protruding laid-together portions of the sheet 10 to be clamped on the outside of the resulting tubular structure. It is clear that more complex laid-together configurations of the sheet 10 involving combinations of a lay-up lap seal and an overlap seal also possess the ability to be clamped externally.

A modular clip assembly 18 of the invention is shown in FIG. 1 partially installed on a to-be-formed bond line along laid-together portions of the sheet 10. The modular clip assembly 18 includes a plurality of manually operable clip modules 20 longitudinally interconnected by a flexible cable 22 which is threaded through each module 20 as shown. A pair of retaining beads 23 disposed at each end of the flexible cable 22 confine the individual clip modules 20 on the cable 22. Thus confined, the hand installation of the clip modules 20 is facilitated because the next module to be installed is always close at hand. Each clip module 20 possesses a pair of cooperating parallel jaws 24 which engage and clamp the laid-together portions of the sheet 10 positioned there between. In most applications, the parallel jaws 24 of each modular clip 20 are preferably installed in substantial longitudinal abutment with one another to define a substantially continuous to-be-formed bond line. Although FIGS. 1 and 2 show the parallel jaws 24 of the modular clip assembly 18 installed to form a straight bond line, it is to be understood that curved, substantially continuous bond lines can also be formed. Curved bond lines are particularly useful for forming closures around irregularly shaped substrates, such as, for example, where a to-be-covered substrate changes from a small cross-section at one end to a larger cross-section in the middle and then back to a small cross-section at the other end. A substantially continuous curved bond line can be formed from straight bond line segments using the modular clip asembly 18 shown in FIGS. 1 and 2. Alternatively, special purpose modular clip assemblies can be fabricated with each module having curved parallel jaws that conform to the curvature of the underlying substrate at the location corresponding to the module's position in the assembly. Clamping laid-together portions of the sheet 10 with the modular clip assembly 18 forms a tubular assembly 26 which is ready for heating.

An external heat source (not shown) is used to heat portions of the tubular assembly 26 to bond the materials clamped between the cooperating parallel jaws 24 and to shrink selected portions of the sheet 10 radially around the substrate 12. Suitable external heat sources include for example, electric hot air heat guns, open flame torches and infrared electric lamps.

The modular clip assembly 18 can be used to clamp laid-together portions of cross-linked, dimensionally heat unstable polymeric materials during the application of heat to form two broad categories of bonds. The first category of bonds are formed with self-bonding materials that coalesce with one another at their recovery temperature where juxtaposed and clamped. The second category of bonds are formed with separate adhesive materials sandwiched between the juxtaposed and clamped materials to be bonded. These adhesive materials can be disposed, as shown in FIG. 1, as a layer 28 formed on a portion of the inside surface 16 along at least a part of the to-be-formed bond line sandwiched between the clamped portions of the sheet 10. Alternatively, for example, a strip of hot melt adhesive, supplied separately in the form of a tape, can be interposed between the laid-together portions of the sheet 10 along the to-be-formed bond line prior to clamping and heating.

After the tubular assembly 26 has been heated to form the bond line and to shrink selected portions of the sheet 10, the tubular assembly is preferably allowed to cool to room temperature.

FIG. 2 shows the modular clip assembly 18 of the invention being removed from along the bond line 32 of a finished closure member 34 formed with the sheet 10 about a portion of the elongated substrate 12.

FIG. 3 is a cross-sectional view of the tubular assembly 26 as seen through the lines 3—3 in FIG. 1. An individual clip module 20 is shown clamping laid-together portions of the sheet 10 which is formed with self-bonding polymeric materials.

FIG. 4 is a cross-sectional view through the lines 4—4 in FIG. 1 which illustrates the adhesive layer 28 and the strip of hot melt adhesive tape 30 positioned for clamping between laid-together portions of the sheet 10. When adhesive as shown in FIG. 4 are employed the sheet 10 need not be self-bonding.

FIG. 5 is a partial cross-sectional view through the lines 5—5 in FIG. 2 which shows a portion of a completed closure member 34 formed around the substrate 12 with the clip module 20 removed. The coalescing of self-bonding materials is shown stylistically in this view.

FIG. 6 is a cross-sectional view through the lines 6—6 in FIG. 2 which shows a portion of the bonded and heat shrunk sheet 10 with a clip module 20 in place. This view illustrates how the cooperating parallel jaws on the clip module 20 are configured to avoid interference with the recovery of the clamped portions of the sheet 10.

FIG. 7 is a cross-sectional view through the lines 7—7 in FIG. 2 illustrating the clamped, bonded and heat-shrunk tubular assembly 26 with a stylized adhesive 36 bonding the clamped portions of the sheet 10.

The foregoing discussion of FIGS. 1 through 7 has focused on a presently preferred use of the modular clip assembly 18 in the formation of a wrap-around closure member 34 from a single sheet 10. Nevertheless, it is to be understood that the scope of the invention's utility is broader. For example, the invention can be used to temporarily clamp, during heat bonding, laid-together edge portions of two smaller sheets of cross-linked, dimensionally heat-unstable polymeric material to form a larger sheet. Further, the invention can be used with a sheet of cross-linked, dimensionally heat-unstable polymeric material to form an end closure around a truncated substrate. Such a closure may be formed by positioning the sheet formed in a generally tubular configuration to overhang the truncated end of the substrate and by extending the bond line normally disposed along the longitudinal axis of the substrate around the truncated end to seal off the overhanging tubular portion. Similarly, the modular clip assembly of the invention can be used to form an end closure cap by forming a bond line at one end of a tubular section of cross-linked, dimensionally heat-unstable polymeric material.

FIG. 8 is a perspective view of a stylized modular clip assembly 80 which best illustrates the structural elements of the invention. A first manually operable clip module 82 possesses first and second parallel jaws 84 and 86 respectively. These jaws are connected respectively to first and second handles 88 and 90. A hinge means, shown generally at 92, allows the jaws 84 and 86 to move cooperatively into and out of engagement with each other in longitudinally parallel relationship. A spring means, shown as a coil spring 94, urges the jaws 84 and 86 into engagement. The assembly includes a second manually operable clip module 96 which possesses elements corresponding to those of the first manually operable clip module 82. Flexible linking means, shown as a chain 98, interconnects the first and second clip modules 82 and 96 respectively. The chain 98 functions to maintain the selected longitudinal relationship shown, thereby facilitating the hand installation of the modular clip assembly 80 along the to-be-formed bond line. Third and fourth manually operable clip modules 100 and 102 respectively, are shown in FIG. 8 to better illustrate the advantages of longitudinally interconnecting individual clip modules. Each of the parallel jaw pairs on the four modules shown 82, 96, 100 and 102 are specially configured to conform to a portion of a selected to-be-formed curved bond line corresponding to the module's position in the longitudinal assembly of modules 80. The chain 98 maintains the selected longitudinal relationship shown between the four modules thereby insuring that the proper jaw pairs are installed at each location along the selected to-be-formed curved bond line.

FIG. 9 is an uninstalled perspective view of the modular clip assembly 18 shown partially installed in FIGS. 1 and 2. Although the modular clip assemblies shown in FIGS. 1, 2, 8 and 9 each are formed with four clip modules, it is to be understood two or more modules can be longitudinally interconnected to form an assembly of any desired length.

FIGS. 10 through 13 provide four views of a presently preferred embodiment of the clip module 20. Novel improvements have been made in a clip described in the Ashmore Patent (referenced above) to arrive at the clip module shown. The module 20 is formed with a pair of substantially identical plates 104 of generally T-shaped configuration which is best seen in FIG. 11. Each plate possesses an inside surface 106, an outside surface 108, a jaw portion 110 corresponding to the upper horizontal part of the T and a handle portion 112 corresponding to the vertical part of the T. A pair of projections 114 on the jaw portion 110 are disposed parallel to and on opposite sides of the handle portion 112. These projections are cupped on their inside surfaces 106 to form spherical-bearing seats 116. The plates 104 are juxtaposed as shown with a pair of ball bearings 118 disposed between aligned bearing seats 116 thereby forming two joints about which the plates 104 may rock. A pair of tubular clamping springs 120 are disposed around the joints to hold the plates 104 together and to urge the jaw portions 110 into engagement with one another.

The jaw portions 110 of the plates 104 are provided with a pair of bond line gripping flanges 122 which are disposed inwardly at substantially right angles to adjacent jaw portions of the plates. Each bond line gripping flange 122 and adjacent jaw portion 110 have a generally L-shaped cross-sectional configuration which is best seen in FIG. 12. When the jaws of the module 20 are in the closed position, as is shown in FIG. 10, the short arms of the L's which correspond to the gripping flanges 122 are substantially colinear. The jaw portions 110 of the plates 104 which correspond to the long arms of the L's are provided with a plurality of ventilating apertures 124 adjacent the gripping flanges 122 as best seen in FIGS. 11 and 13. The ventilating apertures 124 provide passageways for hot air and/or radiant heat from the external heat source to reach the laid-together materials clamped between a pair of gripping faces 126 on the bond line gripping flanges 122. The apertures 124 also allow a craftsman heating clamped materials to observe their heat recovery as it progresses.

The optimum dimensions and specifications for the clip module 20 just described are, of course a function of the clip's intended use and engineering tradeoffs. Generally, a larger percent ratio of aperture surface area to total jaw portion surface area is desirable as it facilitates a more rapid heating and cooling of the clamped materials. This percent ratio is, of course, limited by structural considerations. Preferably, the percent ratio is between about 10% and about 90%. For the clip to be easily hand installable, it is preferred that the pressure applied by squeezing the handle portions 112 between thumb and forefinger as shown in FIG. 1 not exceed 10 pounds. More preferably, that the squeezing force required to open the jaws be between about 3 pounds and about 5 pounds. The thermal conductivity of the clip is preferably greater than the thermal conductivity of the material to be bonded. The gripping faces 126 on the bond line gripping flanges 122 are preferably smooth so as to not cut or otherwise damage the clamped materials. The force per unit area exerted on clamped materials depends in part on the longitudinal length of the clip, shown in FIG. 11 as the dimension "A"; the thickness of the gripping flanges 122, shown in FIG. 11 as the dimension "B"; the distance of the gripping flanges from the ball-bearing joints, shown in FIG. 12 as the dimension "E"; and the placement and characteristics of the tubular clamping springs 120. The clamping force per unit area must be sufficient to hold the materials to be bonded in intimate contact initially and throughout the heating and cooling cycle. The flange depth, shown as the dimension "D" in FIG. 12 is equal to one-half the internal jaw clearance, shown as the dimension "C" in FIG. 10. The internal jaw clearance "C" is preferably equal to or greater than the composite thickness of the laid-together, bonded and fully recovered materials with which the clip module 20 is to be used. Such a clearance prevents the inside surfaces 106 of the plates 104 from interfering with the recovery of the clamped materials.

By way of example, a few dimensions and specifications are given for a presently prefered clip module 20 intended for use with a longitudinally slit section of Raychem type MS-251 self-bonding, heat shrinkable tubing in the formation of a wrap-around closure member such as is shown in FIGS. 1 and 2. The wall thickness of this tubing is initially about 0.030 inches and has a fully recovered thickness of about 0.090 inches. This tubing is available from Raychem Corporation, Menlo Park, Calif. The plates 104 are stamped from low carbon steel sheets about 0.040 inches thick and chrome plated. The approximate values for the dimensions represented in FIGS. 10, 11 and 12 by the letters A, B, C, D, and E are as follows:

A = 2 inches
B = 0.040 inches
C = 0.180 inches
D = 0.090 inches
E = 1 inch

Each gripping face 126 has a surface area of about 0.08 square inches and exerts a clamping force of about 40 pounds per square inch. The apertures 124 are formed with a plurality of mutually parallel slots, each $\frac{1}{2}$ inch long × $\frac{1}{8}$ inch wide disposed on $\frac{1}{4}$ inch centers substantially as shown in FIG. 11.

From the foregoing detailed description, it will be evident that there are a number of changes, adaptations and modifications of the present invention which come within the province of those skilled in the art; however, it is intended that all such variations not departing from the spirit of the invention be considered as within the scope thereof as limited solely by the appended claims.

We claim:

1. A modular clip assembly for clamping laid-together portions of cross-linked, dimensionally heat unstable polymeric material along a to-be-formed bond line during the application of heat from an external heat source to form a bond between clamped portions of said material comprising:

a first manually operable clip module possessing first and second parallel jaws formed with a pair of cooperating plates, each of said cooperating plates possessing a terminal portion disposed inwardly to form a pair of continuous bond line gripping flanges, each continuous gripping flange and associated plate having a generally L-shaped cross-sectional configuration, the short arms of the L's which correspond to said continuous gripping flanges being substantially colinear when said jaws are closed, the portions of said plates corresponding to the long arms of the L's being provided with a plurality of ventilating apertures adjacent said continuous gripping flanges, first and second handles connected respectively to said first and second jaws, hinge means for allowing said jaws to move cooperatively into and out of engagement with each other in longitudinally parallel relationship, and spring means for urging said jaws into mutual engagement;

a second manually operable clip module possessing elements corresponding to those of said first manually operable clip module; and flexible linking means interconnecting said first and second clip modules for maintaining a selected longitudinal relationship between said modules thereby facilitating the hand installation of said modular clip assembly along said to-be-formed bond line.

2. A modular clip assembly for clamping laid-together portions of cross-linked, dimensionally heat unstable polymeric material along a to-be-formed bond line during the application of heat from an external heat source to form a bond between clamped portions of said material comprising:

a first manually operable clip module possessing first and second parallel jaws, first and second handles connected respectively to said first and second jaws, hinge means for allowing said jaws to move cooperatively into and out of engagement with each other in longitudinally parallel relationship, and spring means for urging said jaws into mutual engagement; and a second manually operable clip module possessing elements corresponding to those of said first manually operable clip module, one of said manually operable clip modules being formed with a pair of substantially identical plates of generally T-shaped configuration, each plate possessing a jaw portion corresponding to the upper horizontal part of the T, a handle portion corresponding to the vertical part of the T and a pair of projections on said jaw portion disposed parallel to and on opposite sides of said handle portion, said projections being cupped on their inside surfaces to form spherical-bearing seats, said plates being juxtaposed with a pair of ball bearings disposed between aligned bearing seats thereby forming two joints about which said plates may rock, said selected clip module further possessing a pair of tubular clamping springs which embrace said joints holding said plates together and urging said jaw portions into engagement, said selected clip module further comprising jaw portions of said plates possessing a pair of continuous bond line gripping flanges disposed inwardly at substantially right angles to adjacent jaw portions of said plates, each continuous bond line gripping flange and adjacent jaw portions of said plate having a generally L-shaped cross-sectional configuration, the short arm of the L corresponding to said continuous flange having a length of at least one-half maximum composite thickness of fully heat-recovered materials intended to be clamped by said selected clip module, the portions of said plate corresponding to the long arm of the L being provided with a plurality of ventilating apertures adjacent said continuous flange; and flexible linking means interconnecting said first and second clip modules for maintaining a selected longitudinal relationship between said modules thereby facilitating the hand installation of said modular clip assembly along said to-be-formed bond line.

3. The modular clip assembly of claim 2 wherein said flexible linking means comprises a cable.

4. The modular clip assembly of claim 2 wherein said flexible linking means comprises a chain.

5. In a clip of the type having a pair of longitudinally parallel jaws formed with a pair of cooperating plates, spring means urging said jaws toward a closed position in which said jaws are in contact with each other and manually operable means for urging said jaws away from said closed position the improvment comprising:
  a pair of jaws each possessing a continuous gripping flange disposed inwardly at the terminal portion of each said cooperating plate, each continuous gripping flange and associated plate having a generally L-shaped cross-sectional configuration, the short arm of the L's which correspond to said continuous gripping flanges being substantially colinear in said closed position, the portions of said plates corresponding to the long arms of the L's being provided with a plurality of ventilating apertures adjacent said continuous gripping flanges.

6. An improved clip intended for use in a modular longitudinal assembly of similar clips to clamp laid-together portions of cross-linked, dimensionally heat unstable polymeric material along a to-be-formed bond line during the application of heat from an external heat source to form a bond between clamped portions of said material, said clip being of the type formed with a pair of substantially identical plates of generally T-shaped configuration, each plate possessing a jaw portion corresponding to the upper horizontal part of the T, a handle portion corresponding to the vertical part of the T and a pair of projections on said jaw portion disposed parallel to and on opposite sides of said handle portion, said projections being cupped on their inside surfaces to form spherical-bearing seats, said plates being juxtaposed with a pair of ball bearings disposed between aligned bearing seats thereby forming two joints about which said plates may rock, said clip further possessing a pair of tubular clamping springs which embrace said joints holding said plates together and urging said jaw portions into engagement wherein the improvement comprises:
  jaw portions of said plates possessing a pair of continuous bond line gripping flanges disposed inwardly at substantially right angles to adjacent jaw portions of said plates, each continuous bond line gripping flange and adjacent jaw portion of said plate having a generally L-shaped cross-sectional configuration, the short arm of the L corresponding to said continuous flange having a length of at least one-half the maximum composite thickness of fully heat-recovered materials intended to be clamped by said modular clip, the portions of said plate corresponding to the long arm of the L being provided with a plurality of ventilating apertures adjacent said continuous flange.

7. A modular clip assembly for clamping laid-together portions of cross-linked, dimensionally heat unstable polymeric material along a to-be-formed bond line during the application of heat from an external heat source to form a bond between clamped portions of said material comprising:
  a first manually operable clip module possessing first and second parallel jaws, each of said jaws possessing a terminal portion disposed inwardly to form a pair of continuous bond line gripping flanges, each of said continuous gripping flanges and said jaws forming a generally L-shaped cross-sectional configuration, first and second handles connected respectively to said first and second jaws, hinge means for allowing said jaws to move cooperatively into and out of engagement with each other in longitudinally parallel relationship, and spring means for urging said jaws into mutual engagement;
  a second manually operable clip module possessing elements corresponding to those of said first manually operable clip module; and
  flexible linking means interconnecting said first and second clip modules for maintaining a selected longitudinal relationship between said modules thereby facilitating the hand installation of said modular clip assembly along said to-be-formed bond line.

8. The modular clip assembly of claim 7, wherein said continuous gripping flanges corresponding to the short arms of the L-shaped cross-sectional configuration are substantially colinear when said jaws are closed.

9. The modular clip assembly of claim 7, wherein said first and second parallel jaws belonging to one of said manually operable clip modules engage along a common plane forming a straight line therein.

10. The modular clip assembly of claim 7, wherein said first and second parallel jaws belonging to one of said manually operable clip modules engage along a common plane forming a curved line therein.

11. The modular clip assembly of claim 7, wherein said first and second parallel jaws belonging to one of said manually operable clip modules engage along a first and second interconnected curved plane.

12. The modular clip assembly of claim 7, wherein said flexible linking means comprises a cable.

13. The modular clip assembly of claim 7, wherein said flexible linking means comprises a chain.

14. The modular clip assembly of claim 7, wherein said first and second parallel jaws corresponding to the long arms of the L-shaped cross-sectional configuration being substantially shorter in length than the longitudinal length of said terminal gripping flanges corresponding to the short arms of the L-shaped cross-sectional configuration.

15. The modular clip assembly of claim 7, wherein a selected one of said manually operable clip modules is formed with a pair of substantially identical jaws of generally T-shaped configuration, each jaw possessing a flange portion corresponding to the upper horizontal part of the T, a handle portion corresponding to a portion of the vertical part of the T, and a pair of projections disposed parallel to and on opposite sides of said handle portion, said projections being cupped on their inside surfaces to form spherical-bearing seats, said jaws being juxtaposed with a pair of ball bearings disposed between aligned bearing seats thereby forming two joints about which said jaws may rock, said selected clip module further possessing a pair of tubular clamping springs which embrace said joints holding said jaws together and urging said gripping flange into engagement.

16. The modular clip assembly of claim 7, wherein said jaws are provided with a plurality of ventilating apertures adjacent to said continuous gripping flanges.

* * * * *